(12) United States Patent
Ahn et al.

(10) Patent No.: US 9,329,364 B2
(45) Date of Patent: May 3, 2016

(54) OPTICAL LENS SYSTEM

(71) Applicant: KOLEN CO., LTD., Seongnam Si (KR)

(72) Inventors: Chi Ho Ahn, Seongnam-si (KR);
Kyoung Soo Song, Seongnam-si (KR);
Ji Eun Kim, Seongnam-si (KR); Chan Goo Kang, Seongnam-si (KR); Seong Hee Bae, Daejeon (KR)

(73) Assignee: KOLEN CO., LTD. (KR)

( * ) Notice: Subject to any disclaimer, the term of this patent is extended or adjusted under 35 U.S.C. 154(b) by 0 days.

(21) Appl. No.: 14/583,959

(22) Filed: Dec. 29, 2014

(65) Prior Publication Data

US 2015/0185445 A1    Jul. 2, 2015

(30) Foreign Application Priority Data

Dec. 31, 2013   (KR) ........................ 10-2013-0169340

(51) Int. Cl.

| | |
|---|---|
| *G02B 3/02* | (2006.01) |
| *G02B 13/18* | (2006.01) |
| *G02B 9/60* | (2006.01) |
| *G02B 13/00* | (2006.01) |
| *G02B 13/06* | (2006.01) |
| G02B 13/04 | (2006.01) |
| G02B 3/04 | (2006.01) |
| G02B 5/00 | (2006.01) |

(52) U.S. Cl.
CPC ............ *G02B 13/0045* (2013.01); *G02B 13/06* (2013.01); *G02B 3/04* (2013.01); *G02B 5/005* (2013.01); *G02B 9/60* (2013.01); *G02B 13/04* (2013.01); *G02B 13/18* (2013.01)

(58) Field of Classification Search
CPC ...... G02B 13/0045; G02B 9/60; G02B 13/18; G02B 13/04; G02B 3/04; G02B 5/005
USPC .......................... 359/714, 740, 746, 763, 770
See application file for complete search history.

(56) References Cited

U.S. PATENT DOCUMENTS

| | | | | |
|---|---|---|---|---|
| 5,434,713 | A * | 7/1995 | Sato .................. | G02B 13/06 359/725 |
| 7,580,205 | B2 * | 8/2009 | Asami ................ | G02B 13/06 359/762 |
| 8,570,670 | B2 * | 10/2013 | Kubota .............. | G02B 13/0045 359/714 |
| 9,030,764 | B2 * | 5/2015 | Asami ................ | G02B 13/06 359/713 |
| 2007/0139793 | A1 * | 6/2007 | Kawada .............. | G02B 13/06 359/740 |
| 2014/0126070 | A1 * | 5/2014 | Ning .................. | G02B 13/06 359/740 |
| 2015/0271374 | A1 * | 9/2015 | Sun .................... | G02B 13/04 359/740 |

FOREIGN PATENT DOCUMENTS

JP          2003307674 A    10/2003

* cited by examiner

*Primary Examiner* — Evelyn A Lester
(74) *Attorney, Agent, or Firm* — St. Onge Steward Johnston & Reens, LLC

(57) ABSTRACT

An optical lens system includes sequentially from an object side to an image plane side: a first lens having a negative refractive power and an object side surface that is convex toward the object side; a second lens having a negative refractive power and an object side surface that is convex toward the object side; a third lens having a positive refractive power and an image side surface that is convex toward the image side; a fourth lens having a negative refractive power and an object side surface that is concave toward the object side; and a fifth lens having a positive refractive power and an image side surface that is convex toward the image side.

20 Claims, 4 Drawing Sheets

OPTICAL LENS SYSTEM

FIELD OF THE INVENTION

One or more embodiments of the inventive concept relate to an ultra-wide angle optical lens system.

BACKGROUND OF THE INVENTION

In general, a camera is mounted in a mobile communication terminal, a laptop computer, and a vehicle in order to display peripheral image information or take pictures. Regarding an optical apparatus using a solid state imaging device such as a digital camera, an exchangeable lens system, or a video camera, users have demanded high resolution and high magnification. Also, as many mobile communication terminals, computers, or laptop computers are manufactured these days to have a small size, small, light, and high quality cameras are required. In addition, with regard to a vehicle camera, a small, light, and high quality camera is necessary in order not to block the driver's view and not to degrade the outer appearance of the vehicle. Also, such a camera has to have a wide viewing angle to obtain image information from a vast area.

Accordingly, along with attempts to manufacture a high quality camera by appropriately arranging a plurality of lenses, researches for increasing an optical viewing angle, reducing a focal distance to make a lens system with a small size, and at the same time, for achieving stable optical performance have been conducted.

SUMMARY OF THE INVENTION

One or more embodiments of the inventive concept include an ultra-wide angle optical lens system used in a vehicle.

Additional aspects will be set forth in part in the description which follows and, in part, will be apparent from the description, or may be learned by practice of the presented embodiments.

According to one or more embodiments of the inventive concept, an optical lens system includes sequentially from an object side to an image plane side: a first lens having a negative refractive power and an object side surface that is convex toward the object side; a second lens having a negative refractive power and an object side surface that is convex toward the object side; a third lens having a positive refractive power and an image side surface that is convex toward the image side; a fourth lens having a negative refractive power and an object side surface that is concave toward the object side; and a fifth lens having a positive refractive power and an image side surface that is convex toward the image side, wherein the optical lens system satisfies the following condition $$0.20 < |\tan \theta/f| < 0.21,$$

where f denotes a focal length of the optical lens system, and θ denotes a viewing angle of the optical lens system.

The optical lens system may satisfy the following condition $$7 < TL/f < 8,$$

where TL denotes a distance from the object side surface of the first lens to an image plane.

The optical lens system may satisfy the following condition $$24 < V4-(V1-V2) < 26,$$

where V1 denotes an Abbe's number of the first lens, V2 denotes an Abbe's number of the second lens, and V4 denotes an Abbe's number of the fourth lens.

The optical lens system may satisfy the following condition $$5.5 < R1/f < 6.5,$$

where R1 denotes a radius of curvature of the object side surface of the first lens, and f denotes a focal length.

The first through fifth lenses may include at least one aspherical lens.

The second lens, the third lens, the fourth lens, and the fifth lens may have aspherical surfaces at both surfaces thereof.

The second lens, the third lens, the fourth lens, and the fifth lens may be plastic lenses.

An aperture stop may be disposed between the third lens and the fourth lens.

The first lens may be a meniscus lens.

The second lens may be a meniscus lens.

The fourth lens may be a biconcave lens.

The optical lens system may have a viewing angle ranging from about 180° to about 210°.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Figure 1:
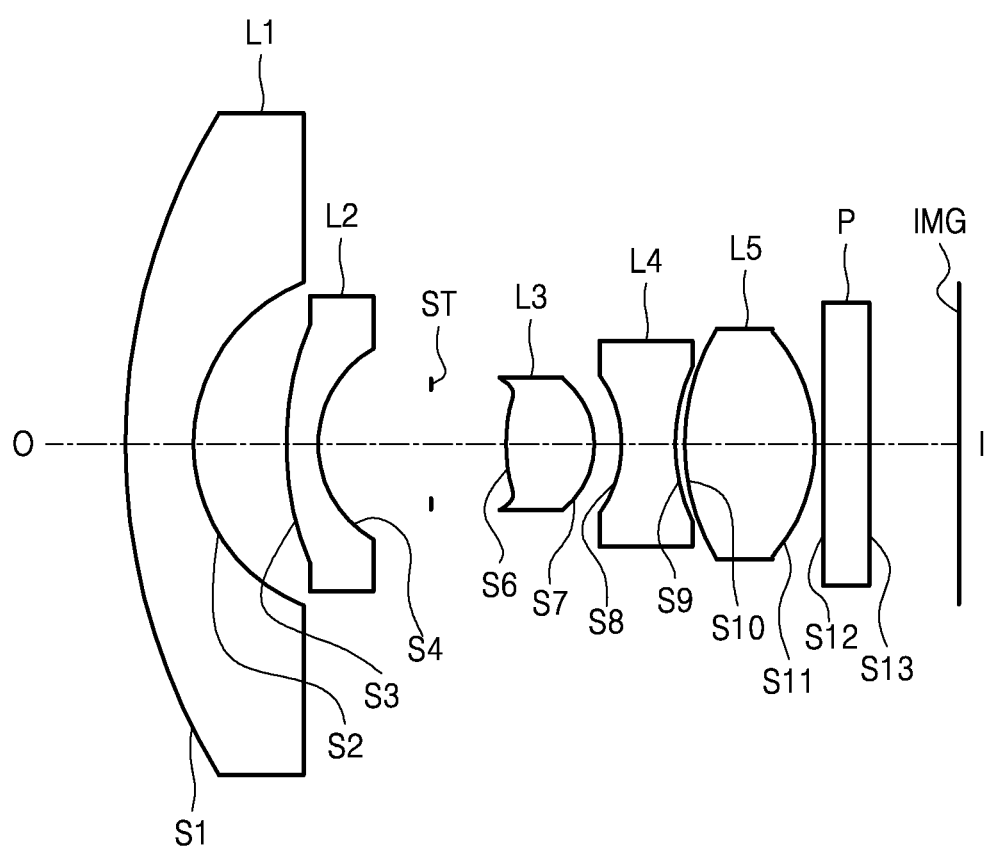
FIG. 1 is a diagram showing an optical lens system according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, the inventive concept will be described in detail by explaining preferred embodiments of the invention with reference to the attached drawings.

FIG. 1 is a diagram showing an optical lens system according to an embodiment of the present invention.

The optical lens system may include a first lens L1 having a negative refractive power, a second lens L2 having a negative refractive power, a third lens L3 having a positive refractive power, a fourth lens L4 having a negative refractive power, and a fifth lens L5 having a positive refractive power that are sequentially arranged from an object side O to an image side I.

The first lens L1 may have an object side surface S1 that is convex toward the object side O. The first lens L1 may be, for example, a meniscus lens. The second lens L2 may have an object side surface S3 that is convex toward the object side O.

The second lens L2 may be a meniscus lens. The third lens L3 may have an image side surface S7 that is convex toward the image side I. The third lens L3 may be a biconvex lens.

The fourth lens L4 may have an object side surface S8 that is concave toward the object side O. The fourth lens L4 may have an image side surface S9 that is concave toward the image side I. The fourth lens L4 may be a biconcave lens. The fifth lens L5 may have an image side surface S11 that is convex toward the image side I. The fifth lens L5 may have an object side surface S10 that is convex toward the object side O. The fifth lens L5 may be a biconvex lens.

An aperture stop ST may be disposed between the second lens L2 and the third lens L3. At least one filter P may be disposed between the fifth lens L5 and the image plane IMG. The image plane IMG may be a surface of, for example, an imaging device such as a charge coupled device (CCD). The filter may include, for example, at least one of a low pass filter and an infrared ray (IR)-cut filter. However, the optical lens system may be configured without using the filter P.

According to the present embodiment, at least one selected from the first to fifth lenses L1, L2, L3, L4, and L5 may be an aspherical lens. For example, each of the first to fifth lenses L1, L2, L3, L4, and L5 may be the aspherical lens. For example, the second lens L2, the third lens L3, the fourth lens L4, and the fifth lens L5 may have aspherical surfaces at both surfaces. The aspherical lens may easily correct spherical aberration.

The optical lens system according to the present embodiment may include at least one plastic lens. For example, the second to fifth lenses L2, L3, L4, and L5 may be plastic lenses. The first lens L1 may be a glass lens. As such, manufacturing costs may be reduced by using the plastic lens.

The optical lens system according to the present embodiment may satisfy following condition.

$$0.20 < |\tan \theta / f| < 0.21 \quad (1)$$

Here, f denotes a focal length of the optical lens system, and θ denotes a viewing angle of the optical lens system.

The above condition (1) denotes a ratio of the viewing angle with respect to the focal length. If a value of |tan θ/f| is equal to or less than the lowest limit of the condition (1), aberration may be easily corrected, but an ultra-wide angle optical lens system may not be realized. If the value of |tan θ/f| exceeds the highest limit of the condition (1), the ultra-wide angle optical lens system may be realized, but it is difficult to correct aberration. That is, when the value is within the range of the condition (1), the optical lens system may have the ultra-wide angle and easily correct the aberration.

The optical system according to the present embodiment may satisfy the following condition.

$$7 < TL/f < 8 \quad (2)$$

Here, TL denotes a distance from the object side surface of the first lens L1 to the image plane IMG.

The above condition (2) denotes a ratio of a total length of the optical lens system with respect to the focal length of the optical lens system. If a value of TL/f is equal to or greater than the highest limit, it is easy to correct spherical aberration and coma aberration, but it is difficult to realize the ultra-wide angle and small size. In addition, if the value of TL/f is equal to or less than the lowest limit, the ultra-wide angle and small-sized optical lens system may be realized, but it is difficult to correct the spherical aberration and the coma aberration.

The optical lens system according to the present embodiment may satisfy following condition.

$$24 < V4 - (V1 - V2) < 26 \quad (3)$$

Here, V1 denotes an Abbe's number of the first lens, V2 denotes an Abbe's number of the second lens, and V4 denotes an Abbe's number of the fourth lens. The above condition (3) defines materials of the first, second, and fourth lenses. When the above condition (3) is satisfied, the aberration may be easily corrected by using the plastic lenses that are cheap.

The optical lens system according to the present embodiment may satisfy following condition.

$$5.5 < R1/f < 6.5 \quad (4)$$

Here, R1 denotes a radius of curvature of the object side surface of the first lens, and f denotes a focal length.

The condition (4) denotes a ratio between the radius of curvature of the object side surface of the first lens and the focal length. If a value of R1/f is equal to or less than the lowest limit, the spherical aberration and distortion may be easily corrected, but the ultra-wide angle and the small size may not be realized. In addition, if the value of R1/f is equal to or greater than the highest limit, the ultra-wide angle and small-sized optical lens system may be realized, but it may be difficult to correct the spherical aberration and the distortion.

In addition, the aspherical surface according to one or more embodiments of the present invention will be defined as follows.

The aspherical surface shape of the optical lens system according to the present embodiment may be defined by following equation, when it is assumed that an optical axis direction is a z-axis, a direction perpendicular to the optical axis direction is y-axis, and a proceeding direction of a light ray is positive direction. Here, Z denotes a distance from a vertex of the lens along the optical axis, Y denotes a distance in a direction perpendicular to the optical axis, K denotes a conic constant, A, B, C, D, E, F, G, H, and J denote aspherical coefficients, and R is a radius of curvature at the vertex of the lens.

$$Z = \frac{Y^2}{R(1 + \sqrt{1 - (1+K)Y^2/R^2})} + AY^4 + BY^6 + CY^8 + DY^{10} + EY^{12} + FY^{14} + GY^{16} + HY^{18} + JY^{20} \quad (5)$$

The ultra-wide angle and small-sized optical lens system may be realized through following embodiments according to various designs.

Hereinafter, design data of the optical lens system according to the one or more embodiments of the present invention will be described. Here, f denotes the focal length expressed in units of mm, Fno denotes an F number, and θ denotes a viewing angle expressed in units of degree. R denotes a radius of curvature, Dn denotes a distance between lenses or lens thickness, Nd denotes a refractive index, Vd denotes an Abbe's number, Object denotes an object, IMG denotes an image plane, and * denotes an aspherical surface. In tables of the embodiments, the lens surfaces are numbered sequentially from the object side O to the image side I.

First Embodiment

FIG. 1 shows an optical lens system according to the first embodiment, and the lens data of the first embodiment is as follows.

FNo.=2.8, f=1.5886 mm, θ=198 degrees

TABLE 1

| Lens surfaces | R | Dn | Nd | Vd |
|---|---|---|---|---|
| Object | Infinity | Infinity | | |
| S1 | 9.4485 | 1.0000 | 1.716 | 53.94 |
| S2 | 2.5624 | 1.3482 | | |
| S3* | 2.5246 | 0.5000 | 1.534 | 55.86 |
| S4* | 1.3272 | 1.6490 | | |
| ST | Infinity | 1.0993 | | |
| S6* | 2.5374 | 1.3083 | 1.534 | 55.86 |
| S7* | −1.2429 | 0.3902 | | |
| S8* | −2.8446 | 0.8000 | 1.642 | 23.89 |
| S9* | 1.6747 | 0.1404 | | |
| S10* | 3.3460 | 1.9107 | 1.534 | 55.86 |
| S11* | −1.8393 | 0.1000 | | |
| S12 | Infinity | 0.7000 | | |
| S13 | Infinity | 1.3297 | | |
| IMG | Infinity | 0.0138 | | |

Aspherical coefficients of the optical lens system according to the first embodiment are as follows.

TABLE 2

| Lens surfaces | K | A | B | C | D | E | F | G | H | J |
|---|---|---|---|---|---|---|---|---|---|---|
| S3 | 0.0717 | −0.0328 | −0.0035 | −0.0004 | 0.0004 | −0.0001 | — | — | — | — |
| S4 | −1.5426 | 0.0285 | 0.0128 | −0.0180 | 0.0055 | −0.0000 | — | — | — | — |
| S6 | 0.7941 | −0.0417 | −0.1554 | 0.2790 | −0.4209 | | — | — | — | — |
| S7 | 0.1012 | 0.0579 | −0.0521 | 0.0453 | −0.0225 | | — | — | — | — |
| S8 | 4.7773 | −0.1497 | −0.0224 | −0.0157 | 0.0214 | | — | — | — | — |
| S9 | −5.6588 | −0.0376 | 0.0031 | 0.0010 | −0.0008 | | — | — | — | — |
| S10 | −2.2398 | 0.0027 | −0.0039 | 0.0026 | −0.0003 | −0.0000 | — | — | — | — |
| S11 | −1.0633 | −0.0035 | −0.0002 | 0.0011 | 0.0005 | −0.0000 | — | — | — | — |

Figure 2:
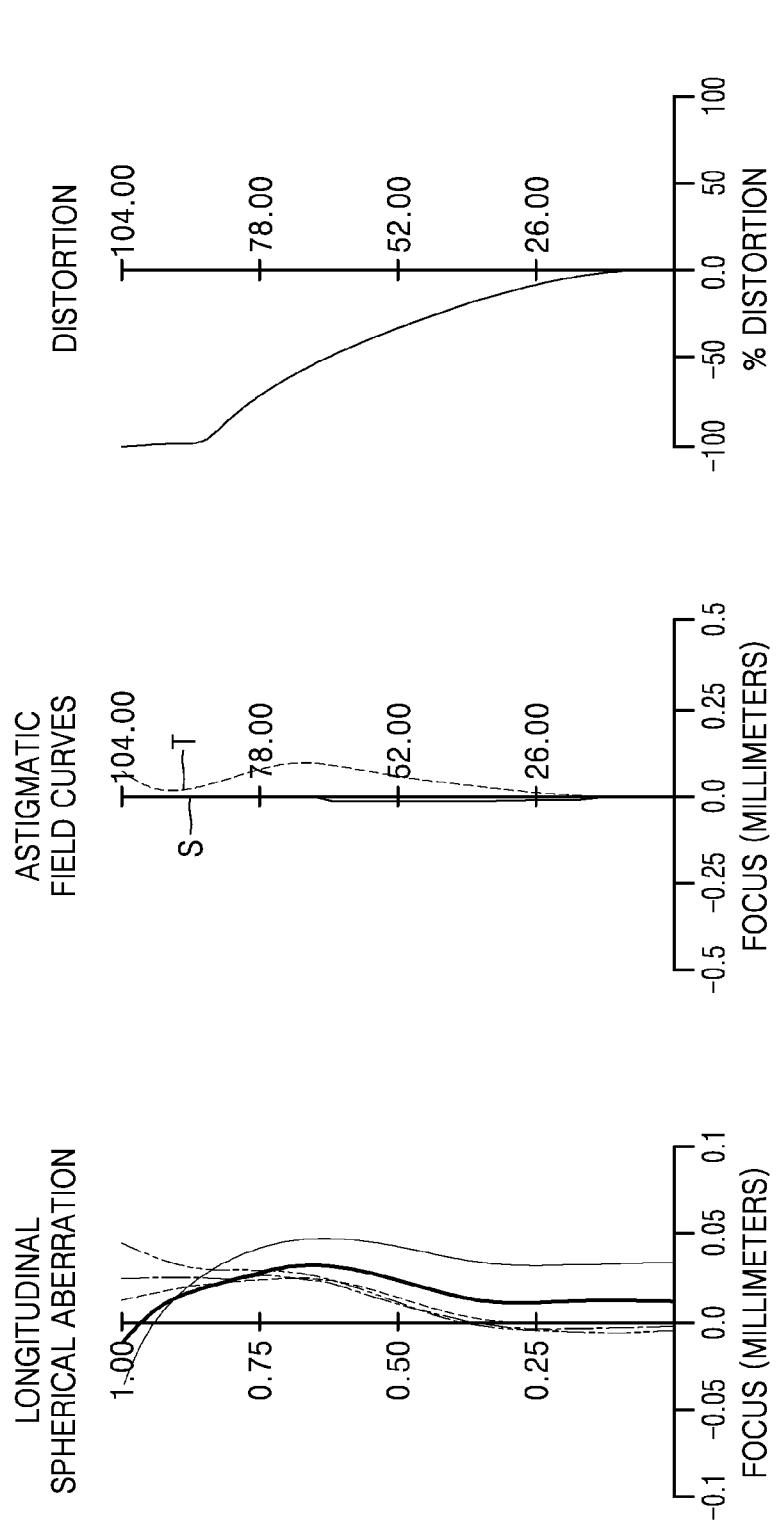
FIG. 2 is an aberration diagram of the optical lens system of FIG. 1.

FIG. 2 shows a longitudinal spherical aberration, an astigmatic field curves, and a distortion of the optical lens system according to the first embodiment of the present invention. As the astigmatic field curvature, a tangential field curvature (T) and a sagittal field curvature (S) are shown.

Second Embodiment

Figure 3:
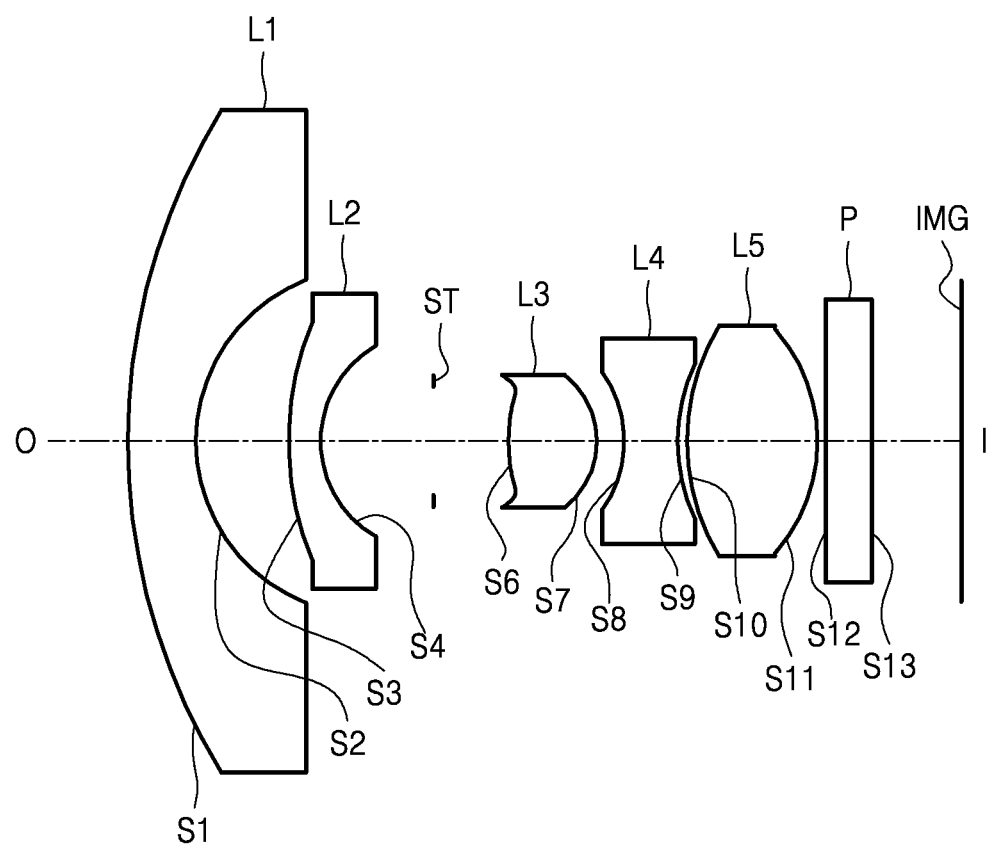
FIG. 3 is a diagram showing an optical lens system according to another embodiment of the present invention.

FIG. 3 shows an optical lens system according to the second embodiment, and the lens data of the second embodiment is as follows.

FNo.=2.8, f=1.5843 mm, θ=198 degrees

TABLE 3

| Lens surfaces | R | Dn | Nd | Vd |
|---|---|---|---|---|
| Object | Infinity | Infinity | | |
| S1 | 9.4701 | 0.9725 | 1.716 | 53.94 |
| S2 | 2.5495 | 1.3516 | | |
| S3* | 2.5297 | 0.5000 | 1.534 | 55.86 |
| S4* | 1.3237 | 1.6038 | | |
| ST | Infinity | 1.1727 | | |
| S6* | 2.5660 | 1.3157 | 1.534 | 55.86 |
| S7* | −1.2486 | 0.4405 | | |
| S8* | −2.8821 | 0.8000 | 1.642 | 23.89 |
| S9* | 1.6882 | 0.1378 | | |
| S10* | 3.3504 | 1.9619 | 1.534 | 55.86 |
| S11* | −1.8518 | 0.1000 | | |
| S12 | Infinity | 0.7000 | | |
| S13 | Infinity | 1.2010 | | |
| IMG | Infinity | 0.0226 | | |

Aspherical coefficients of the optical lens system according to the second embodiment are as follows.

TABLE 4

| Lens surfaces | K | A | B | C | D | E | F | G | H | J |
|---|---|---|---|---|---|---|---|---|---|---|
| S3 | 0.0805 | −0.0336 | −0.0034 | −0.0004 | 0.0004 | −0.0001 | — | — | — | — |
| S4 | −1.6041 | 0.0310 | 0.0115 | −0.0175 | 0.0054 | −0.0000 | — | — | — | — |
| S6 | 0.4296 | −0.0459 | −0.1499 | 0.2669 | −0.4039 | | — | — | — | — |
| S7 | 0.0949 | 0.0575 | −0.0496 | 0.0411 | −0.0195 | | — | — | — | — |
| S8 | 4.7668 | −0.1412 | −0.0187 | −0.0195 | 0.0255 | | — | — | — | — |
| S9 | −5.4498 | −0.0376 | 0.0032 | 0.0012 | −0.0008 | | — | — | — | — |
| S10 | −2.3801 | 0.0028 | −0.0038 | 0.0026 | −0.0004 | −0.0000 | — | — | — | — |
| S11 | −1.0871 | −0.0032 | −0.0004 | 0.0012 | 0.0005 | −0.0000 | — | — | — | — |

Figure 4:
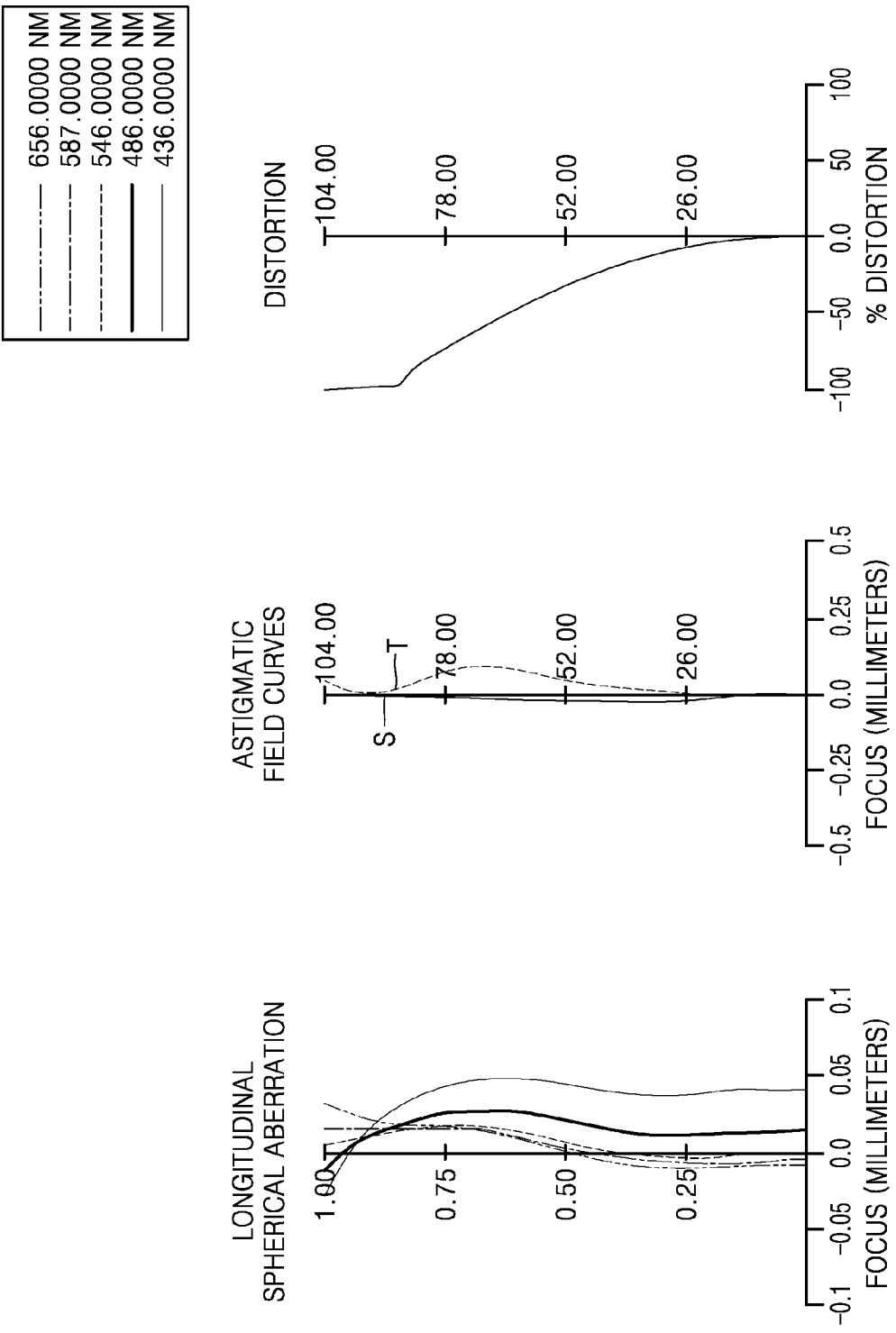
FIG. 4 is an aberration diagram of the optical lens system of FIG. 3.

FIG. 4 shows a longitudinal spherical aberration, an astigmatic field curves, and a distortion of the optical lens system according to the second embodiment of the present invention.

Following table shows that the first and second embodiments of the present invention satisfy the above conditions (1) and (2).

TABLE 5

|  | tan θ | f | condition 1 | TL | Condition 2 | Condition 3 | Condition 4 |
|---|---|---|---|---|---|---|---|
| First embodiment | 0.3249 | 1.5886 | 0.2045 | 12.289 | 7.7357 | 25.81 | 5.94769 |
| Second embodiment | 0.3249 | 1.5843 | 0.2051 | 12.280 | 7.7511 | 25.81 | 5.97747 |

The optical lens system according to the embodiments of the present invention includes five lenses, and may realize the ultra-wide angle. For example, the optical lens system according to the embodiments of the present invention may have the viewing angle ranging from 180° to 210°. According to the optical lens system of the present invention, the positive refractive power is distributed to the third lens and the fifth lens so that the spherical aberration and the color aberration may be easily corrected. Also, the optical lens system according to the embodiments of the present invention may correct various aberration and improve performances by using four plastic aspherical lenses. Also, the manufacturing costs may be reduced by using the plastic aspherical lenses.

Since the optical lens system according to the embodiments of the present invention has the ultra-wide angle, the optical lens system may be adopted as a camera for vehicles, a security camera, and a surveillance camera. The camera for vehicles may be, for example, a rear-view camera. However, the present invention is not limited thereto, but may be applied to other photographing devices.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An optical lens system comprising sequentially from an object side to an image plane side:
   a first lens having a negative refractive power and an object side surface that is convex toward the object side;
   a second lens having a negative refractive power and an object side surface that is convex toward the object side;
   a third lens having a positive refractive power and an image side surface that is convex toward the image side;
   a fourth lens having a negative refractive power and an object side surface that is concave toward the object side; and
   a fifth lens having a positive refractive power and an image side surface that is convex toward the image side,
   wherein the optical lens system satisfies the following condition $0.20 < |\tan \theta / f| < 0.21$, where f denotes a focal length of the optical lens system, and θ denotes a viewing angle of the optical lens system.

2. The optical lens system of claim 1, wherein the optical lens system satisfies the following condition $7 < TL/f < 8$, where TL denotes a distance from the object side surface of the first lens to an image plane.

3. The optical lens system of claim 1, wherein the optical lens system satisfies the following condition $24 < V4 - (V1 - V2) < 26$, where V1 denotes an Abbe's number of the first lens, V2 denotes an Abbe's number of the second lens, and V4 denotes an Abbe's number of the fourth lens.

4. The optical lens system of claim 1, wherein the optical lens system satisfies the following condition $5.5 < R1/f < 6.5$, where R1 denotes a radius of curvature of the object side surface of the first lens, and f denotes a focal length.

5. The optical lens system of claim 1, wherein the first through fifth lenses include at least one aspherical lens.

6. The optical lens system of claim 5, wherein the second lens, the third lens, the fourth lens, and the fifth lens have aspherical surfaces at both surfaces thereof.

7. The optical lens system of claim 1, wherein the second lens, the third lens, the fourth lens, and the fifth lens are plastic lenses.

8. The optical lens system of claim 1, wherein an aperture stop is disposed between the third lens and the fourth lens.

9. The optical lens system of claim 1, wherein the first lens is a meniscus lens.

10. The optical lens system of claim 1, wherein the second lens is a meniscus lens.

11. The optical lens system of claim 1, wherein the fourth lens is a biconcave lens.

12. The optical lens system of claim 1, wherein the optical lens system has a viewing angle ranging from about 180° to about 210°.

13. An optical lens system comprising, sequentially from an object side to an image plane side:
   a first lens having a negative refractive power;
   a second lens having a negative refractive power;
   a third lens having a positive refractive power;
   a fourth lens having a negative refractive power; and
   a fifth lens having a positive refractive power,
   wherein the optical lens system satisfies following conditions $0.20 < |\tan \theta / f| < 0.21$, $7 < TL/f < 8$, where f denotes a focal length of the optical lens system, θ denotes a viewing angle of the optical lens system, and TL denotes a distance from the first lens to an image plane.

14. The optical lens system of claim 13, wherein the optical lens system satisfies the following condition $$24 < V4-(V1-V2) < 26,$$

where V1 denotes an Abbe's number of the first lens, V2 denotes an Abbe's number of the second lens, and V4 denotes an Abbe's number of the fourth lens.

15. The optical lens system of claim 13, wherein the optical lens system satisfies the following condition $$5.5 < R1/f < 6.5,$$

where R1 denotes a radius of curvature of the object side surface of the first lens, and f denotes a focal length.

16. The optical lens system of claim 13, wherein the second lens, the third lens, the fourth lens, and the fifth lens have aspherical surfaces at both surfaces thereof.

17. The optical lens system of claim 13, wherein the second lens, the third lens, the fourth lens, and the fifth lens are plastic lenses.

18. The optical lens system of claim 13, wherein an aperture stop is disposed between the third lens and the fourth lens.

19. The optical lens system of claim 13, wherein the first and second lenses are meniscus lenses.

20. The optical lens system of claim 13, wherein the optical lens system has a viewing angle ranging from about 180° to about 210°.

\* \* \* \* \*